United States Patent
Ploof et al.

(10) Patent No.: US 10,829,846 B2
(45) Date of Patent: Nov. 10, 2020

(54) PROCESS FOR PRODUCING NANOSTRUCTURED METAL SUBSTRATES FOR USE IN SURFACE ENHANCED RAMAN SPECTROSCOPY OR SIMILAR APPLICATIONS

(71) Applicants: Lloyd Ploof, Lee Center, NY (US); Jody Ray McRedmond, Ilion, NY (US); Thomas Joseph Basile, Clinton, NY (US)

(72) Inventors: Lloyd Ploof, Lee Center, NY (US); Jody Ray McRedmond, Ilion, NY (US); Thomas Joseph Basile, Clinton, NY (US)

(*) Notice: Subject to any disclaimer, the term of this patent is extended or adjusted under 35 U.S.C. 154(b) by 100 days.

(21) Appl. No.: 16/156,612

(22) Filed: Oct. 10, 2018

(65) Prior Publication Data

US 2020/0071812 A1    Mar. 5, 2020

Related U.S. Application Data

(60) Provisional application No. 62/723,635, filed on Aug. 28, 2018.

(51) Int. Cl.
| | |
|---|---|
| C23C 8/42 | (2006.01) |
| C23C 8/02 | (2006.01) |
| C23C 28/00 | (2006.01) |
| C23C 8/80 | (2006.01) |

(52) U.S. Cl.
CPC .......... *C23C 8/42* (2013.01); *C23C 8/02* (2013.01); *C23C 8/80* (2013.01); *C23C 28/32* (2013.01); *C23C 28/345* (2013.01)

(58) Field of Classification Search
None
See application file for complete search history.

(56) References Cited

U.S. PATENT DOCUMENTS

| | | | |
|---|---|---|---|
| 4,409,037 | A | 10/1983 | Landau |
| 4,961,828 | A | 10/1990 | Lin et al. |
| 5,472,563 | A | 12/1995 | Kogawa et al. |
| 6,120,639 | A | 9/2000 | Redline et al. |
| 9,795,040 | B2 | 10/2017 | Wei et al. |
| 2017/0025377 | A1 * | 1/2017 | Gondcharton .......... H01L 24/27 |

(Continued)

FOREIGN PATENT DOCUMENTS

| | | | |
|---|---|---|---|
| DE | 2947886 A1 | 7/1981 | |
| EP | 0926263 A2 * | 6/1999 | ............ C23C 18/54 |

OTHER PUBLICATIONS

Maxwell, Dustin, et al., Nanostructured Thin-Film Materials with Surface-Enhanced Optical Properties, Chem Mater. 2001, vol. 13, pp. 1082-1088; 2001, Amer. Chem. Soc.

(Continued)

*Primary Examiner* — Nadine G Norton
*Assistant Examiner* — Bradford M Gates
(74) *Attorney, Agent, or Firm* — Bernhard P. Molldrem, Jr.

(57) ABSTRACT

A framework of copper oxide dendrites is formed on a copper substrate, and these are then coated or plated with silver, gold, or an equivalent metal to create metal-coated dendrites with nano-structures, favorably in range of 50 to 200 nanometers. The framework of metal-coated dendrites are well suited for use in surface-enhanced Raman spectroscopy and other practical applications.

7 Claims, 1 Drawing Sheet

Silver Coated Cupric Oxide Dendrites at 5000X

(56) References Cited

U.S. PATENT DOCUMENTS

2017/0027065 A1* 1/2017 Wei .................... H05K 3/385
2018/0223412 A1 8/2018 Mogi et al.

OTHER PUBLICATIONS

Wen, Jin et al., SERS-active silver nanoparticle assemblies on branched Cu2O crystals through controlled galvanic replacement; RSC Advances, 2014, vol. 4, pp. 53543-53546, Royal Society of Chemistry, 2014.
Tao Gao et al., Controlled Synthesis of Homogeneous Ag Nanosheet-Assembled Film for Effective SERS Substrate; Applied Materials & Interfaces, 2013, vol. 5, pp. 7308-7314, American Chemical Society, 2013.

* cited by examiner

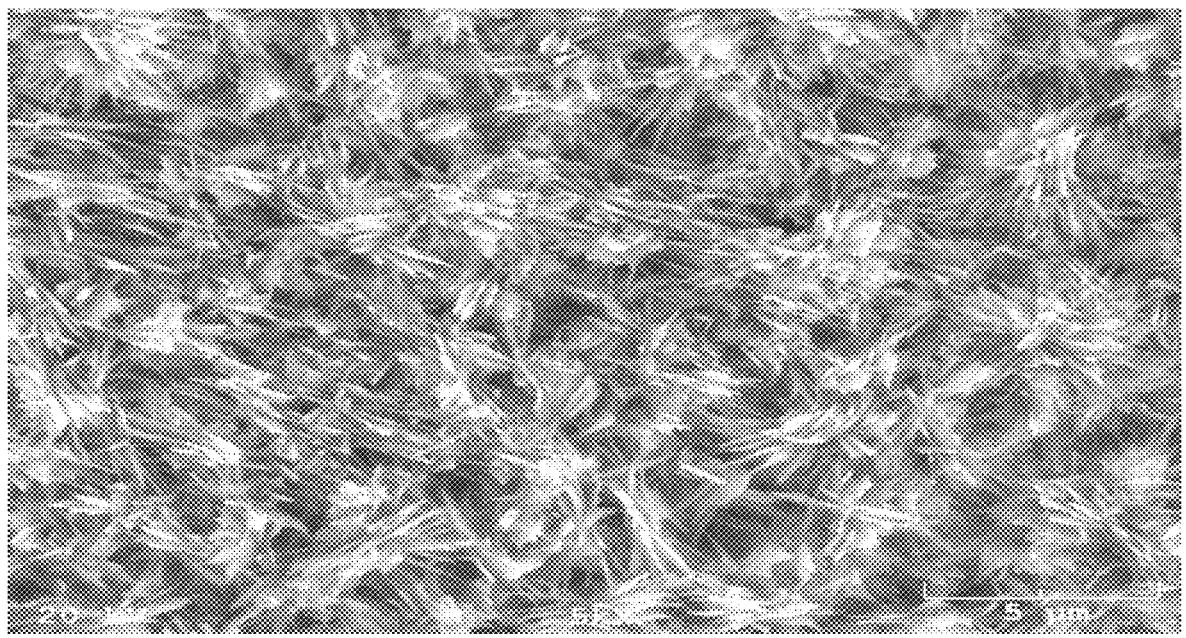
FIG. 1 -- Cupric Oxide Dendrites at 5000X SEM
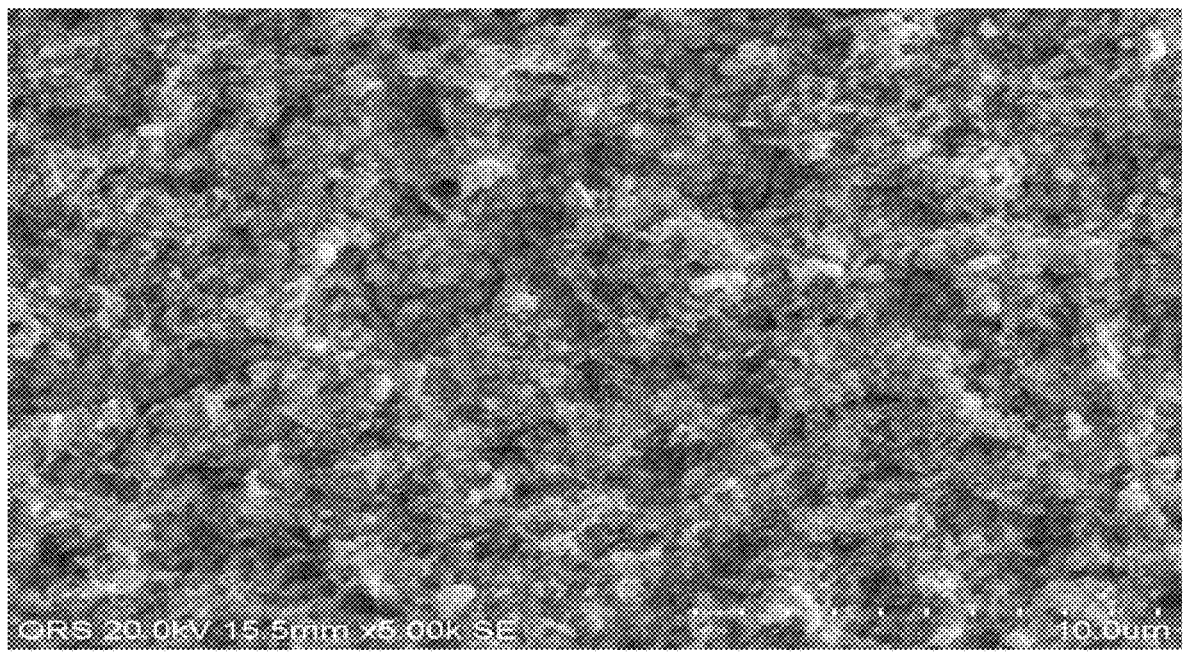
FIG. 2 -- Silver Coated Cupric Oxide Dendrites at 5000X

PROCESS FOR PRODUCING NANOSTRUCTURED METAL SUBSTRATES FOR USE IN SURFACE ENHANCED RAMAN SPECTROSCOPY OR SIMILAR APPLICATIONS

This application claims priority under 35 U.S.C. 119(e) of Provisional Application Ser. No. 62/723,635, filed Aug. 28, 2018, the disclosure of which is incorporated by reference herein.

BACKGROUND OF THE INVENTION

It is known, and described in relevant literature that certain metal structures having nanoscale features may have beneficial application in Surface Enhanced Raman Spectroscopy (SERS), and may also have benefits in applications such as Electronics, Solar Cells, Magnetic Devices, Batteries, and others. Especially useful structures for Surface Enhanced Raman Spectroscopy, among others, include precious metal nanostructures in the range of 0.01 to 100 um, specifically in the range of 0.05-0.2 um, i.e., 50 to 200 nanometers.

Current technology to produce such structures include electrochemical deposition, chemical vapor disposition, micro/nano fabrication, and chemical synthesis. Many of these methods are either expensive, not really scalable to mass production size quantities, or are not consistently reproducible.

Gao, Wang, Wang, Zhang, et al. (See bibliography) discuss how to grow silver nanosheet assembled films on copper by growing dendrites made of silver. The method employed there was not easily reproducible and the adhesion of the silver film was very poor.

Maxwell, Emory, and Nie (See bibliography) discuss use of colloidal silver particles to form a nanostructured silver film. This method is expensive, slow, susceptible to many variables, and not easy to scale.

Jin, Xu, Xiong, Jing, Zhang, Sun, and Han (See bibliography) discuss a process for galvanically depositing silver on Cu2O crystals, but those crystals were electrostatically deposited and of a different morphology from copper oxide dendrites.

OBJECTS AND SUMMARY OF THE INVENTION

The novel method included herein is cost effective, readily reproducible, and easily scaled for production.

This method creates a framework of copper oxide dendrites to produce the desired geometry and then coats those dendrites with a metal by immersion (galvanic replacement) chemistry, electroless disposition, or electrolytic deposition to coat the dendrites to create metal coated-dendrites in the range of 0.01-100 um. The metal used to coat the dendrites would typically a monetary metal, e.g., noble metal such as gold or silver, or equivalent such as palladium or platinum, but could be any suitable metal from the group formed of silver, gold, platinum, palladium, nickel, tin, or combinations of them, or from any such metal that may be deposited on such copper oxide dendrites by immersion, electroless deposition, or electrolytic deposition.

The process for forming a nano-scale substrate suitable for use in Surface Enhanced Raman Spectroscopy (SERS) and/or other similar applications, starts with a substrate having thereon a layer of copper, which may be solid, copper, sheet, bar, or other form. The copper may have any purity, but should preferably 80% copper or better. This is subjected to oxidation in a process bath to form a layer copper oxide dendrites thereon having a length on the order of up to 100 μm, and a width of 0.5 to 10 μm. The substrate and dendrites are cleaned and rinsed, and then a noble metal or equivalent is deposited onto the copper oxide dendrites. The metal coated dendrites are subjected to cleaning and rinsing such that the noble-metal coated dendrites are suitable for SERS and/or other suitable applications.

The copper layer may be subjected to oxidation in an aqueous reagent bath with sulfur compounds and oxidizers, carried out at an elevated temperature on the order of 90° C. This should result in dendrites in lengths from less than one micron up to a hundred microns, preferably from 50 to 200 nanometers.

The preferred noble metal may be gold or silver, but can be selected from the group consisting of Ag, Au, Pa and Pt, or selected from a broader group consisting of Ag, Au, Sn, Ni, Cu, Pt, Pa, Rh and Zn.

BRIEF DESCRIPTION OF THE DRAWING

FIG. 1 is an electron micrograph of a layer of cupric oxide dendrites taken a magnification of 5000 using a scanning electron microscope.

FIG. 2 is an electron micrograph of a layer of silver-coated cupric oxide dendrites taken a magnification of 5000 using a scanning electron microscope.

DETAILED DESCRIPTION OF A PREFERRED EMBODIMENT

Chemistries and methods to produce copper oxide dendrites are well known, and these have been used to increase adhesion between subsequent layers of circuit boards in electronics, to increase subsequent paint adhesion on copper, and to blacken copper for optic applications. These chemistries are reactive, and can be acidic or alkaline and may have chlorites, chlorides, sulfur compounds, and oxidizers in them. The appearance of the copper oxide surface may range from a light gray, through brown, to black, but might be other colors depending on the formula of the chemistry. The dendrites may range in length from 0.01 to 100 um and may be needle shaped, fern like, nodular, or fan shaped. (See FIG. 1).

While the technology for producing cupric oxide dendrites has been available for some time, no one has attempted to coat these dendrites with another metal, and specifically, no one has employed plated or coated copper oxide dendrites for Surface Enhanced Raman Spectroscopy. This material may also have applications in electronics, magnetics, batteries, solar cells, and others.

Coating these cupric oxide dendrites with various metals may be carried out with certain galvanic replacement (immersion) chemistries, certain autocatalytic reduction (electroless) chemistries, and certain electrolytic deposition chemistries. Cupric oxide dendrites could also be coated via chemical vapor deposition, physical vapor deposition, sputtering or any other method that might be used to deposit metals on a surface.

The method of this invention is as follows:

A suitable base of copper is formed. This may be copper sheet, pellet, rod, bar, etc., but most preferably a copper sheet of appropriate size and thickness, in any purity up to 100% copper, but most preferably greater than 80% copper. This may favorably be a copper coated substrate on any base material substrate including, but not limited to, steel, stainless steel, aluminum, glass, plastic, or any other material suitably coated with copper.

The afore-mentioned base is then cleaned in a suitable solvent or aqueous cleaner until no surface contamination remains. The cleaned substrate is rinsed in clean water, immersed in an acid solution to remove any unwanted oxides, and then rinsed in clean water again. After this, the cleaned substrate may preferably be chemically polished to produce an optically smooth surface. The chemical polish is followed by another rinse in water. The base is then immersed in a bath of a reactive oxidizing solution for sufficient time to produce the cupric oxide dendrites. This bath may be alkaline or acidic and may have a suitable oxidizer and a sulfur containing compound, among other chemistries, depending on the process selected. The temperature of this bath may be anywhere from room temperature to 200 deg. F. (I.e., 90 deg. C), and the time in the bath can range from a few seconds to several minutes.

After the desired cupric oxide dendrites are formed, the base and dendrites are then rinsed extremely well in good quality water and immersed in an appropriate solution of galvanic displacement chemistry, electroless deposition chemistry, or electrolytic deposition chemistry among others, to deposit the desired metal on the framework of the cupric oxide. This chemistry may be acid, alkaline or neutral and may deposit one or more of the following metals: Silver, Gold, Tin, Nickel, Copper, Platinum, Palladium, Rhodium, Zinc, or any other equivalent metal capable of being deposited. The time in this solution may vary from a few seconds to several hours depending on the solution and the desired amount of metal to be deposited.

After the deposition of the desired metal onto the cupric oxide framework, the part is rinsed well to remove any residual coating solution and dried. An SEM of the cupric oxide coated with a layer of silver is shown in FIG. 2.

The resulting cupric oxide framework coated with metal may now be suitable for Surface Enhanced Raman Spectroscopy, Solar Cells, Electronics, Magnetics, Batteries, and other applications. This process and the resulting metal/cupric oxide framework can be optimized to produce consistent morphologies and extremely consistent micro- or nano-topographies, as needed for the desired application. This process can be optimized to produce larger or smaller framework sizes with other metal or material combinations.

BIBLIOGRAPHY

1) T. Gao, Y. Wang, K. Wang, X. Zhang, J. Dui, G. Li, S. Lou, S. Zhou ; ACS Appl. Mater. Interfaces 2013, 5, 7308-7314
2) D. J. Maxwell, S. R. Emory, S. Nie; Chem. Mater., 2001, 13, 1082
3) W. Jin, P. Xu, L. Xiong, Q. Jing, B. Zhang, K. Sun, X. Han; RSC Adv., 2014, 4, 53543-53546

We claim:

1. Process for forming a nano-scale substrate suitable for use in Surface Enhanced Raman Spectroscopy (SERS) and/or other similar Raman spectroscopy applications, comprising:
   starting with a substrate having thereon a layer of copper;
   subjecting the copper layer to oxidation in a process bath to form a layer of copper oxide dendrites thereon having sizes on the order of up to 100 μm and of one μm;
   cleaning the substrate and the copper oxide dendrites;
   depositing on the copper oxide dendrites a coating of a noble metal; and
   cleaning and rinsing the noble-metal coating to render the substrate and coated dendrites suitable for SERS and/or other suitable Raman spectroscopy applications.

2. The process of claim 1 wherein said step of starting with a layer of copper is followed by a step of chemically polishing said layer of copper.

3. The process of claim 1 wherein step of subjecting the copper layer to oxidation in a process bath includes employing an aqueous reagent bath with sulfur compounds and oxidizers.

4. The process of claim 1 wherein said step of subjecting the copper layer to oxidation in a process bath results in dendrites in a plurality of sizes from less than one micron up to a hundred microns.

5. The process of claim 1 wherein said subjecting the copper layer to oxidation in a process bath is carried out at an elevated temperature of about 90° C.

6. The process of claim 1 wherein said noble metal is selected from the group consisting of Ag, Au, Pa and Pt.

7. The process of claim 1 wherein said noble metal consists of one or more from the group consisting of Ag, Au, Sn, Ni, Cu, Pt, Pa, Rh and Zn.

* * * * *